United States Patent

Clark

[11] 3,936,435
[45] Feb. 3, 1976

[54] CATIONIC HETEROCYCLIC-AZO-HETEROCYCLIC COMPOUNDS FROM 5-AMINOIMIDAZO-(1,2-A)PYRIDINES

[75] Inventor: Gary T. Clark, Kingsport, Tenn.
[73] Assignee: Eastman Kodak Company, Rochester, N.Y.
[22] Filed: Aug. 8, 1974
[21] Appl. No.: 495,619

[52] U.S. Cl.......... 260/146 R; 260/146 D; 260/154; 260/156; 260/256.4 F; 260/305; 260/306.7 T; 260/306.8 F; 260/295 F; 260/296 H
[51] Int. Cl.²..................... C09B 43/00; C09B 29/36
[58] Field of Search............ 260/146 R, 146 D, 154, 260/156

[56] References Cited
UNITED STATES PATENTS

| | | | |
|---|---|---|---|
| 2,569,418 | 9/1951 | Kellog | 260/154 |
| 2,790,172 | 4/1957 | Rudner | 260/158 X |
| 3,167,537 | 1/1965 | Menzel et al. | 260/146 R |
| 3,420,813 | 1/1969 | Mueller et al. | 260/156 |
| 3,804,823 | 4/1974 | Fisher et al. | 260/146 D X |
| 3,809,691 | 5/1974 | Carpenter et al. | 260/156 X |

FOREIGN PATENTS OR APPLICATIONS

| | | | |
|---|---|---|---|
| 1,234,891 | 2/1967 | Germany | 260/162 |
| 1,541,566 | 10/1968 | France | 260/157 |

OTHER PUBLICATIONS
Pentimalli et al., *Chemical Abstracts*, Vol. 66, 1967, 11837s.

*Primary Examiner*—Charles F. Warren
*Attorney, Agent, or Firm*—Elliott Stern; Daniel B. Reece, III

[57] ABSTRACT

Dyestuff having the general formula

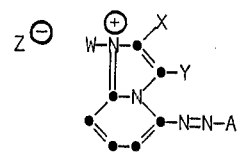

wherein A represents

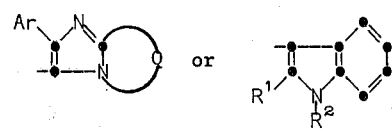

wherein Q is

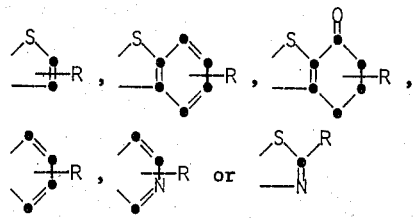

Ar is phenyl or phenyl substituted with chlorine, bromine, lower alkyl or lower alkoxy;
R is hydrogen, lower alkyl, phenyl or phenyl substituted with lower alkyl, lower alkoxy, chloro or bromo;
$R^1$ and $R^2$ are the same or different and each is hydrogen, lower alkyl, benzyl or phenyl;
W is lower alkyl or benzyl;
X is hydrogen or lower alkyl;
Y is hydrogen, lower alkoxycarbonyl, lower alkyl or formyl; and
Z is a basic dye anion. These dyes impart bright colorfast orange to red shades to acrylic, modacrylic, acid-modified polyester and acid-modified polyamide fibers.

11 Claims, No Drawings

CATIONIC HETEROCYCLIC-AZO-HETEROCYCLIC COMPOUNDS FROM 5-AMINOIMIDAZO-(1,2-A)PYRIDINES

This invention relates to cationic dyes from 5-aminoimidazo[1,2-a]pyridine and heterocyclic couplers, and to the use of such dyes for imparting bright, colorfast orange-red shades to acrylic, modacrylic, acid-modified polyester and acid-modified polyamide textile fibers, yarns, and fabrics.

The novel dyestuffs of this invention have the general formula

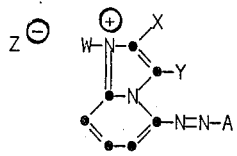

wherein A represents

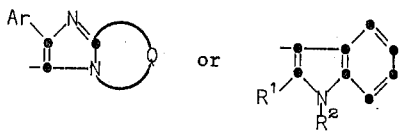

wherein Q is

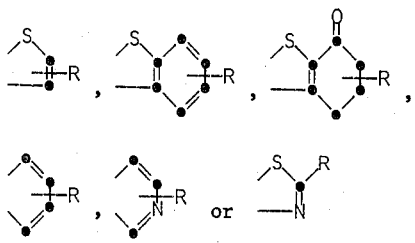

Ar is phenyl or phenyl substituted with chlorine, bromine, lower alkyl or lower alkoxy;

R is hydrogen, lower alkyl, phenyl or phenyl substituted with lower alkyl, lower alkoxy, chloro or bromo;

$R^1$ and $R^2$ are the same or different and each is hydrogen, lower alkyl, benzyl or phenyl;

W is lower alkyl or benzyl;

X is hydrogen or lower alkyl;

Y is hydrogen, lower alkoxycarbonyl, lower alkyl or formyl; and

Z is a basic dye anion.

As used herein to describe a substituent containing an alkyl radical, the term "lower" designates a carbon content of from 1 to about 6 carbon atoms.

Typical of the groups representative of Ar are phenyl or phenyl substituted with chlorine, bromine, lower alkyl or lower alkoxy. Specific examples of such phenyl groups include but are not limited to phenyl, p-tolyl, m-ethylphenyl, p-anisyl, p-chlorophenyl, o-bromo-p-tolyl, o-dichlorophenyl, and the like.

Typical of the groups representative of R are hydrogen, ethyl, methyl, pentyl, butyl, phenyl, p-tolyl, m-ethylphenyl, p-methoxyphenyl, p-chlorophehyl, p-anisyl, o-bromo-p-tolyl, o-dichlorophenyl, etc.

Typical of the groups representative of $R^1$ and $R^2$ are hydrogen, methyl, ethyl, isopropyl, butyl, benzyl, phenyl, etc. They may be the same or different.

Typical of the groups represented by W are methyl, ethyl, propyl, benzyl, etc.

Typical of the groups represented by X are hydrogen, methyl, ethyl, propyl, butyl, etc. Typical of the groups representative of Y are hydrogen, methyoxycarbonyl, ethoxycarbonyl, butoxycarbonyl, methyl, ethyl, propyl, and formyl. Typical of the anions represented by $Z^\ominus$ are $CH_3SO_4^\ominus$, $ZnCl_{4/2}^\ominus$, $Cl^\ominus$, $Br^\ominus$, $I^\ominus$, $SO_{4/2}^\ominus$,

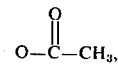

and $H_2PO_4^\ominus$. It is pointed out that the anion does not affect the utility of the cationic portion of the compounds of the invention as dyes, nor does it affect the dye affinity of the cations for textile materials. Since the cation of a cationic dye is responsible for the color of the compound, the particular anion associated with the cation is not important.

In a preferred embodiment of this invention the coupler component A represents

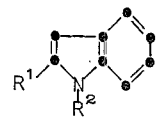

wherein:

$R^1$ and $R^2$ are methyl, phenyl or benzyl;

W is methyl;

X is hydrogen or methyl; and

Y is methoxycarbonyl, ethoxycarbonyl, methyl, ethyl or formyl.

The dyes of this invention are prepared by the diazotization of the appropriately substituted 5-aminoimidazo[1,2-a]pyridine and subsequent coupling with the appropriate coupling component. The resulting dye may then be quaternized by treatment with an alkylating agent such as dimethyl sulfate in an inert solvent to give the cationic dye by proper work-up. These cationic dyes can then be dyed from an acidic bath on acrylic, modacrylic, basic dyeable polyester and basic dyeable polyamide fibers. The 5-aminoimidazo-[1,2-a]pyridines and couplers useful in the preparation of the dyestuffs of this invention may be obtained commercially or according to known procedures. For example, 5-amino-3-carbethoxy-2-methylimidazo[1,2-a]pyridine and 5-amino-3-formylimidazo-[1,2-a]pyridine may be prepared according to W. W. Paudler, R. A. Van Dahm, and Y. N. Park, *J. Hetero. Chem.*, 9, 81 (1972). 5-Amino-2-methylimidazo[1,2-a]pyridine and 5-amino-2,3-dimethylimidazo[1,2-a]pyridine may be prepared according to J. P. Paolini and R. K. Robins, *J. Hetero. Chem.*, 2, 53 (1965). The couplers useful in the preparation of this invention are well known in the art and may be obtained commercially or prepared by methods described in the literature and well known to those skilled in the art. See, for example, U.S. Pat. No. 3,804,823. The method by which a coupled compound can be quaternized is well known to those skilled in the art. For example, the quaternized compound may be prepared by reacting the coupled dye with an alkylating agent in an inert solvent such as toluene. Suitable alkylating agents that can be used are the dialkyl sulfates, the alkyl halides, the aralkyl halides, the alkyl esters of arylsulfonic acids, etc. Examples of such alkylating agents include dimethyl sulfate, diethyl sulfate, ethyl bromide, methyl iodide, benzyl chloride, benzyl bromide, methyl p-toluene sulfonate, and ethylbenzene sulfonate.

The novel dyestuffs of this invention and their preparation are further illustrated by the following examples.

EXAMPLE 1

To a solution of 10.9 g (0.05 mole) of 5-amino-3-carbethoxy-2-methylimidazo [1,2-a]pyridine in 75 ml. of trifluoroacetic acid is added a solution of 3.6 g. of NaNO₂ in 25 ml. of concentrated sulfuric acid, and the solution is stirred at 0°–5°C. for 3 hours. A portion (0.005 mole) of the above solution is added with stirring to 0.005 mole of 1-methyl-2-phenylindole in 25 ml. of 1–5 (1 part propionic to 5 parts acetic acid) acid at 0°–10°C. The solution is neutralized to Congo red paper with ammonium acetate. After coupling is complete, the mixture is poured into ice/water and then made basic with concentrated ammonium hydroxide. The resulting dye is collected by filtration, washed with water and air dried.

1a. The dye obtained from Example 1 is dissolved in 10 ml. of dimethylformamide and 2 ml. of dimethyl sulfate is added. The solution is heated on a steam bath for 1.5 hours and a solution of 5 ml. of isopropyl alcohol and 3 ml. of water is added and heating continuted for 0.5 hour. Water, sodium chloride, and zinc chloride are added and the dye is collected by filtration, washed with 10% NaCl solution and air-dried to yield the following dye.

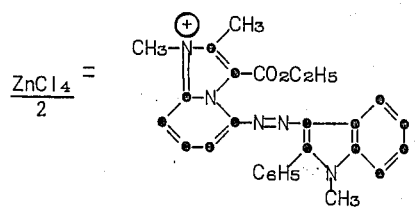

This dye imparts fast orange shades to acrylic, modacrylic, and acidmodified polyester and acid-modified polyamide fibers.

EXAMPLE 2

To a solution of 10.9 g (0.05 mole) of 5-amino-3-carbethoxy-2-methylimidazo [1,2-a]pyridine in 75 ml. of trifluoroacetic acid is added a solution of 3.6 g. of NaNO₂ in 25 ml. of concentrated sulfuric acid, and the solution is stirred at 0-5°C. for 3 hours. A portion (0.005 mole) of the above solution is added with stirring to 0.005 mole of 6,6-dimethyl-i-keto-2-phenyl-5,6,7,8-tetrahydroimidazo[2,2-b]benzothiazole (prepared as in Example 1 of U.S. Pat. No. 3,804,823) in 25 ml. of 1–5 acid at 0°–10°C. The solution is neutralized to Congo red paper with ammonium acetate. After coupling is complete, the mixture is poured into ice/water and then made basic with concentrated ammonium hydroxide. The resulting dye is collected by filtration, washed with water and air-dried.

2a. The dye obtained from Example 2 is dissolved in 10 ml. of dimethylformamide and 2 ml. of dimethyl sulfate is added. The solution is heated on a steam bath for 1.5 hours and a solution of 5 ml. of isopropyl alcohol and 3 ml. of water is added and heating continued for 0.5 hour. Water, sodium chloride and zinc chloride are added and the dye is collected by filtration, washed with 10% NaCl solution and air-dried to yield the following dye.

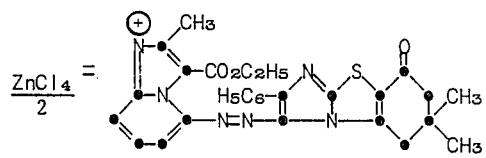

This dye imparts fast red shades to acrylic, modacrylic and acid-modified polyester and acid-modified polyamide fibers.

The following examples in Table 1 are prepared in a manner similar to the above examples.

Table 1

A = Heterocyclic Coupler

| Example | A | X | Y | Z | Color |
|---------|---|---|---|---|-------|
| 3 | 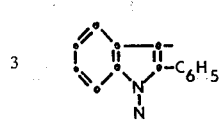 | CH₃ | CO₂C₂H₅ | ZnCl₄/2 | Orange |
| 4 | 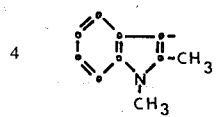 | CH₃ | CO₂C₂H₅ | ZnCl₄/2 | Orange |

Table 1-continued

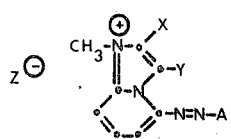

A = Heterocyclic Coupler

| Example | A | X | Y | Z | Color |
|---|---|---|---|---|---|
| 5 | [structure with C$_6$H$_5$, C$_6$H$_5$] | CH$_3$ | CO$_2$C$_2$H$_5$ | $\frac{ZnCl_4}{2}$= | Orange |
| 6 | [structure with C$_6$H$_5$] | CH$_3$ | CO$_2$C$_2$H$_5$ | $\frac{ZnCl_4}{2}$= | Red |
| 7 | [structure with C$_6$H$_5$] | CH$_3$ | CH$_3$ | $\frac{ZnCl_4}{2}$= | Red |
| 8 | [structure with C$_6$H$_5$] | CH$_3$ | H | $\frac{ZnCl_4}{2}$= | Red |
| 9 | [structure with C$_6$H$_5$] | CH$_3$ | CHO | $\frac{ZnCl_4}{2}$= | Red |
| 10 | [structure with C$_6$H$_5$] | CH$_3$ | CO$_2$C$_2$H$_5$ | $\frac{ZnCl_4}{2}$= | Red |
| 11 | [structure with -Br] | CH$_3$ | CO$_2$C$_2$H$_5$ | $\frac{ZnCl_4}{2}$= | Red |
| 12 | [structure with -OCH$_3$] | CH$_3$ | CO$_2$C$_2$H$_5$ | $\frac{ZnCl_4}{2}$= | Red |
| 13 | [structure with C$_6$H$_5$] | CH$_3$ | CO$_2$C$_2$H$_5$ | $\frac{ZnCl_4}{2}$= | Red |
| 14 | [structure with CH$_3$, C$_6$H$_5$] | CH$_3$ | CO$_2$C$_2$H$_5$ | $\frac{ZnCl_4}{2}$= | Red |
| 15 | [structure with C$_6$H$_5$] | CH$_3$ | CO$_2$C$_2$H$_5$ | $\frac{ZnCl_4}{2}$= | Red |

The cationic monoazo compounds of this invention can be used for dyeing acrylic and modacrylic polymer fibers, yarns and fabrics. Acrylic textile materials are those which consist of at least 85 percent acrylonitrile, and modacrylic textile materials are those consisting of at least 35 percent but less than 85 percent acrylonitrile, and are well known in the art. Furthermore, the dyeing procedures for dyeing these fibers are also well known. The cationic compounds of the invention also give excellent dyeings on acid-modified acrylic textile materials such as the sulfonate-modified acrylic fibers described in U.S. Pat. Nos. 2,837,500; 2,837,501; and 3,043,811. The novel cationic compounds can also be used to dye sulfonate-modified polyester fibers such as are described in U.S. Pat. No. 3,018,272.

Although this invention has been described in detail with particular reference to preferred embodiments thereof, it will be understood that variations and modifications can be effected within the scope and spirit of the invention.

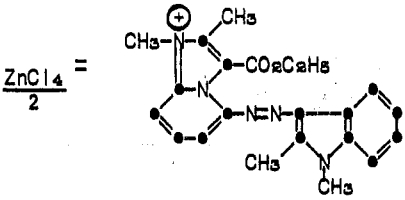

I claim:

1. Dyestuff having the general formula

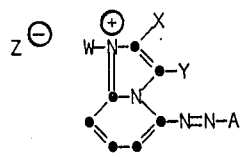

wherein A represents

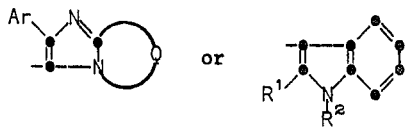

wherein Q is

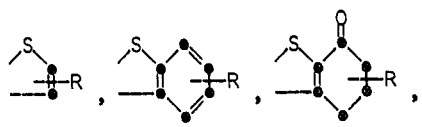

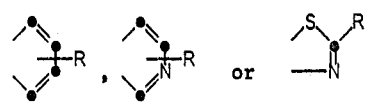

Ar is phenyl or phenyl substituted with chlorine, bromine, lower alkyl or lower alkoxy;
R is hydrogen, lower alkyl, phenyl or phenyl substituted with lower alkyl, lower alkoxy, chloro or bromo;
$R^1$ and $R^2$ are the same or different and each is hydrogen, lower alkyl, benzyl or phenyl;
W is lower alkyl or benzyl;
X is hydrogen or lower alkyl;
Y is hydrogen, lower alkoxycarbonyl, lower alkyl or formyl; and
Z is a basic dye anion.

2. Dyestuff according to claim 1 wherein
R is hydrogen or methyl;
$R^1$ and $R^2$ are methyl, phenyl or benzyl;
W is methyl;
X is hydrogen or methyl; and
Y is methoxycarbonyl, ethoxycarbonyl, methyl, ethyl or formyl.

3. Dyestuff according to claim 2 having the formula

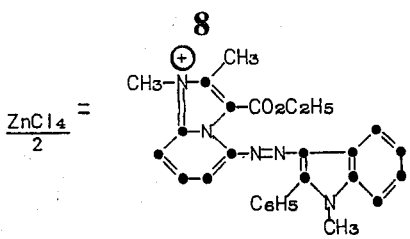

4. Dyestuff according to claim 2 having the formula

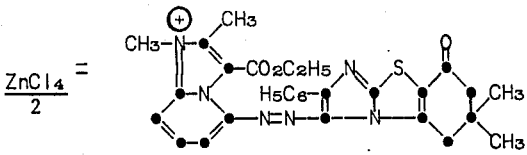

5. Dyestuff according to claim 2 having the formula

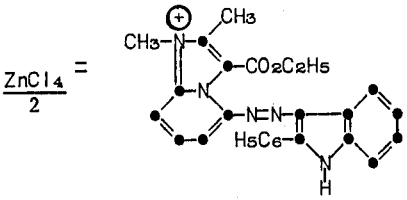

6. Dyestuff according to claim 2 having the formula

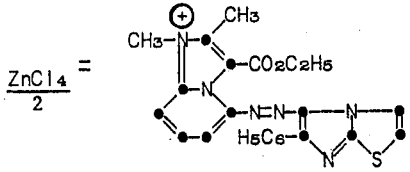

7. Dyestuff according to claim 2 having the formula

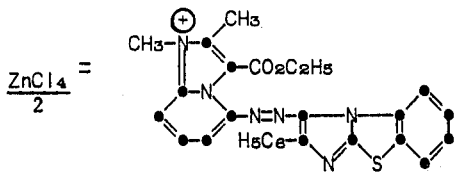

8. Dyestuff according to claim 2 having the formula

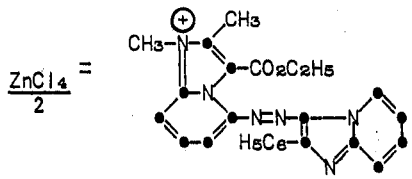

9. Dyestuff according to claim 2 having the formula

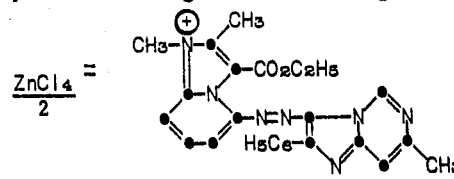

10. Dyestuff according to claim 2 having the formula

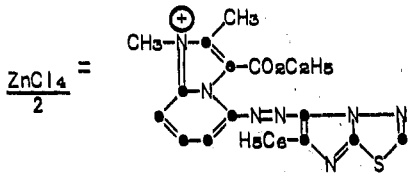

11. Dyestuff according to claim 2 having the formula